US005270099A

United States Patent [19]

Kamiyama et al.

[11] Patent Number: 5,270,099

[45] Date of Patent: Dec. 14, 1993

[54] THERMAL MIMEOGRAPH PAPER

[75] Inventors: Hironori Kamiyama; Kazue Komatsubara; Junichi Hiroi; Mitsuru Tsuchiya; Yozo Kosaka; Shinichi Sakano; Masayuki Ando; Yudai Yamashita, all of Tokyo, Japan

[73] Assignee: Dai Nippon Insatsu Kabushiki Kaisha, Japan

[21] Appl. No.: 743,401

[22] PCT Filed: Dec. 21, 1990

[86] PCT No.: PCT/JP90/01676

§ 371 Date: Oct. 2, 1991

§ 102(e) Date: Oct. 2, 1991

[87] PCT Pub. No.: WO91/09742

PCT Pub. Date: Jul. 11, 1991

[30] Foreign Application Priority Data

Dec. 22, 1989 [JP] Japan ................................ 1-334480

[51] Int. Cl.[5] .............................................. B32B 3/00

[52] U.S. Cl. .................................. 428/195; 428/198; 428/201; 428/202; 428/264; 428/211; 428/537.5; 428/511; 428/913

[58] Field of Search ............... 428/137, 211, 262, 264, 428/290, 335, 336, 341, 342, 359, 360, 361, 413, 423.1, 537.5, 913, 198

[56] References Cited

FOREIGN PATENT DOCUMENTS 0331748 9/1989 European Pat. Off. .

OTHER PUBLICATIONS

Patent Abstracts of Japan, vol. 10, No. 281 (M-250 [2337] Sep. 25, 1986.

Patent Abstracts of Japan, vol. 12, No. 142 (M-692) [2989] Apr. 30, 1988.

Patent Abstracts of Japan, vol. 12, No. 428 (M-762) [3275] Nov. 11, 1988.

Patent Abstracts of Japan, vol. 7, No. 269 (M-259) [1414] Nov. 30, 1983.

Patent Abstracts of Japan, vol. 7, No. 275 (M-261) [1420] Dec. 8, 1983.

*Primary Examiner*—Patrick J. Ryan
*Assistant Examiner*—Elizabeth Evans
*Attorney, Agent, or Firm*—Parkhurst, Wendel & Rossi

[57] ABSTRACT

The present invention provides a thermal mimeograph paper having a point-bonded structure and including a porous backing material and a thermoplastic resin film layer laminated on one side thereof through an adhesive, wherein the porous backing material and the thermoplastic resin film are bonded together by dotwise point bonding. This point-bonded structure enables the perforability of the mimeograph paper to be improved.

5 Claims, 1 Drawing Sheet

THERMAL MIMEOGRAPH PAPER

TECHNICAL FIELD

This invention relates to a stencil paper used for mimeograph and, more particularly, to a heat-sensitive or thermal mimeograph paper designed to be cut or perforated by thermal printing means making use of a heat emitter element like a thermal head.

BACKGROUND TECHNIQUE

So far, mimeograph has been widely used as an expeditious and inexpensive printing system. According to this system, a material comprising a suitable porous backing sheet such as paper and a thermoplastic resin film layer laminated on its surface is used as a heat-sensitive stencil paper. This stencil paper is cut by a thermal head or other means, and the thermoplastic resin film layer is then heated and melted to form an imagewise perforation pattern, through which printing ink is fed to make prints on the material to be printed.

In order to improve the setting properties of stencil paper used with such a thermal setting system as mentioned above, especially, the capability of stencil paper to be perforated - hereinafter simply referred to as perforability, the choice of material and the selection of a bonding agent used for laminating the thermoplastic resin film on the porous backing material present important conditions, because this system is unique. As set forth in JP-A-58(1983)-147396 and 62(1987)-264998 specifications, thermal stencil paper products have heretofore been known in the art, which are obtained by bonding together a porous backing material and a thermoplastic resin film through an adhesive layer having a network or fine regular pattern.

When the backing material and thermoplastic resin film are laminated together with such an adhesive layer having a network pattern as set forth in JP-A-58-147396 specification into stencil paper, a perforating problem arises depending upon the amount of the adhesive applied, causing the deterioration of the resulting image quality.

In the case of stencil paper including an adhesive layer having such a specific, regular pattern as disclosed in JP-A-62-264998, it is awkward in itself to form an adhesive layer having such a regular pattern. According to the inventor's finding, even when the given pattern has been formed, there are such problems as whitening and moire depending upon how much adhesive is applied and to what extent bonding takes place, which in turn occasion various problems in making printing of high resolving power.

Thus, it is a primary object of this invention to provide a thermal stencil paper which can be well cut or perforated and makes printing of high resolving power feasible.

Incidentally, thermal stencil paper used with the above-mentioned conventional, thermal mimeograph system is formed by laminated a thermoplastic resin film layer as thin as a few μm in thickness on a porous backing material, generally paper, with the application of a bonding agent. This bonding agent is typically (1) a solvent (or aqueous) type of adhesive—see, e.g. JP-P-47(1972)-1188 and 1187 publications.

Problems with the solvent type of adhesive, which is used with large amounts of solvents, are that its recovery takes much cost, difficulty is involved in maintaining a working environment, the resulting products are poor in resistance to solvent, and the kind of ink used is limited.

Problems with the aqueous type of adhesive are that the quantity of heat needed for drying is enormous, and the thermoplastic resin film shrinks or the porous backing material suffers dimensional changes due to the heat applied during drying, making stencil paper curl or wrinkle.

(b) a solventless type of curing adhesives which are used for eliminating the above-mentioned defects of the solvent type of adhesives see JP-A-61(1986)-286131, 58(1983)-153697, 62(1987)-181374 and 63(1988)-233890 specifications.

Of these adhesives, the heat curing type of adhesive requires a large amount of heat for curing, and further offers problems that the thermoplastic resin film shrinks or the porous backing material undergo dimensional changes during the production of stencil paper, making the stencil paper curl or wrinkle.

The room temperature or moisture curing type of bonding agent has a defect of curing so slowly that it takes so much time to produce stencil paper; in other words, this is inferior in the productivity of stencil paper.

The ultraviolet curing type of adhesive has again a slow curing rate. At an increased dose, so great a rise in temperature takes place due to infrared rays other than ultraviolet rays, that the thermoplastic resin film shrinks, making stencil paper curl or wrinkle.

The solventless type of adhesive has a general defect of having a viscosity too high to be applied on the thermoplastic resin film or backing material to form a thin film thereon. Particular difficulty is involved in the stable application of it on a limp, thermoplastic resin film because of its viscosity.

When the adhesive is heated to decrease its viscosity, the thermoplastic resin film deforms, rendering its coating difficult. For that reason, it has been proposed to coat the adhesive on the backing material see JP-A-61(1986)-286131 specification. In this case, however, when the span of time required for curing is increased, the backing material is so impregnated with the adhesive that any product of excellent resolving power and image quality cannot be obtained.

The curing type of adhesive is inferior in its heat fusibility after curing and, hence, causes the resulting stencil paper to become worse in terms of perforability, failing to provide any product of high resolving power and excellent image quality.

Thus, a second object of this invention is to achieve economical provision of thermal stencil paper which is free from such problems as mentioned above and so serves well.

As the thermal head of a digital type of thermal mimeographing equipment, use has so far been made of a thin type of thermal head glazed all over the surface, as illustrated in FIG. 3. In some attempts to increase the perforability of stencil paper, the thermal head has been mechanically heated, or its contact with stencil paper has been improved - see JP-A-60(1985)-147338, 60-208244 and 60-48354 specifications.

In other efforts to increase the perforability of stencil paper by making some modifications thereto, the physical properties of the associated thermoplastic resin film, i.e., the thickness, thermal shrinkage factor, crystallinity, etc. thereof have been varied - see JP-A-62(1987)-2829, JP-A-63(1988)-160883, JP-A-62-149496 and JP-A-

62-282984 specifications. In the case of a film formed of a polyethylene terephthalate homopolymer in particular, the perforability is satisfied only when the film has a thickness of at most 2 μm, as set forth in JP-A-60(1985)48398 specification.

The adhesive, whether it is of the solvent type or the solventless type, is applied at a coverage of 0.5 to 3 $g/m^2$ on solid basis see JP-A-1(1989)-148591 and JP-A-62(1987)-1589 specifications.

When the thermal head used is a conventional thin type of full-glazed thermal head, such as one shown in FIG. 3, there is a problem that the film of stencil paper cannot be fully perforated corresponding to the heat emitter element of the thermal head. This is because the heat emitter portion is so concave that its contact with the film is in ill condition.

In order to provide a solution to this problem, it has been proposed to heat the platen - see JP-A-60(1985)-147338 specification or prevent heat from radiating to the platen see JP-A-60-48354 specification. However, such proposals are not so effective because it is the porous backing material of stencil paper that comes in contact with the platen, and result in increased power consumption as well.

In addition, it has been proposed to use a thick film type of thermal head including a convex heat emitter portion in combination with a thin film type of thermal head - see JP-A-60(1985)-208244 specification. This proposal is considered effective for perforability, but presents a problem that the resistance value of the thick film type of thermal head varies so largely that it is impossible to obtain perforations corresponding to the magnitude of the heat emitter element.

Turning on the other hand to the physical properties of the thermoplastic resin film of stencil paper, especially, its thickness, the thinner than 2 μm the thickness, the better the perforability. However, this gives rise to a serious rise in the production cost of stencil paper, or makes the rigidity of stencil paper insufficient, only to offer a problem in connection with feeding it through a printing machine.

Further, it is effective to form the resin of a copolymer, thereby lowering the melting point of the film see JP-A-62(1987)-2829 specification. However, the copolymer degrades the heat resistance, solvent resistance, etc. of the film, so that the processability of the film drops at the time of being laminated onto the porous backing material, or the resulting stencil paper becomes poor in storage stability. The copolymer also lowers the dependence of the film's viscosity upon temperature and so causes stringing, having less influence upon the perforability than expected.

A problem with the adhesive is that the larger the coverage, the better the wear resistance of stencil paper but the lower the perforability of stencil paper. When a solvent type of adhesive is used, there is a problem that skinning takes place among fibers at the time of drying, making not only perforability but also the passage of ink worse.

It is therefore a third object of this invention to provide a thermal mimeograph paper and a printing process, with which the above-mentioned problems can be solved.

Thermal mimeograph paper used with the aforesaid conventional thermal mimeograph system is generally formed by laminating a thermoplastic resin film as thin as a few μm in thickness onto the surface of a porous backing material such as paper. However, because the thermoplastic resin film layer is meltable by heating, there is a problem that the thermal head may be fused to the thermoplastic resin film layer during stencil-making, thus failing to feed stencil paper stably.

In order to avoid this, it has been proposed to form a layer of such a lubricator as silicone oil, silicone resin, a crosslinked type of silicone resin or a phosphate ester on the thermoplastic resin film layer as a thermal fusion preventing layer, thereby preventing the fusion of the thermal head thereto - for instance, see JP-P-63(1988)-233890 and JP-A-61(1986)-40196, 61-164896, 62(1987)-33690 and 62-3691 specifications.

However, problems with the silicone oil are that it is inferior in the capability to form a film; it is less wetting, but repellant, with respect to the thermoplastic resin film, thus failing to form any satisfactory film; and it may contaminate other articles. This is also true of the silicone resin. In addition, oil or scum accumulates on the thermal head, and a type of silicone resin well capable of forming a film is poor in releasability. The crosslinked type of silicone resin, because of its high heat resistance, makes the perforability of the thermoplastic resin film worse. Problems with the phosphate ester are that it is poor in the capability to form a film and causes separation of the thermal fusion preventing layer, giving rise to accumulation of oil or scum on the thermal head. Use of the phosphate ester in combination with a binder presents a similar problem in connection with peeling and scumming, because it is inferior in the compatibility with the binder.

A further problem with the conventional thermal fusion preventing layer is that its insufficient antistatic properties make the feeding of stencil paper so worse that it is likely to stick to a drum during stencil-making or printing.

It is therefore a fourth object of this invention to achieve economical provision of thermal mimeograph paper with which the above-mentioned problems can be solved, and which shows excellent performance with no accumulation of oil or scum on the thermal head even when continuously used to make stencils.

SUMMARY OF THE INVENTION

The first aspect of this invention is directed to a thermal mimeograph paper including a thermoplastic resin film layer laminated on one side of a porous backing material through an adhesive, which is of a point-bonded structure wherein said porous backing material and said thermoplastic resin film are bonded together by dotwise point bonding.

In this aspect, it is preferred that the total area of points of adhesion between said porous backing material and said thermoplastic resin film accounts for 1 to 30% of the area of any region of 180 μm×340 μm.

According to the inventors' finding, the perforability of stencil paper can be improved by making adhesion between the porous backing material and the thermoplastic resin film by dotwise point bonding, as mentioned above.

The second aspect of this invention is directed to a thermal mimeograph paper including a thermoplastic resin film layer laminated on one side of a porous backing material through an adhesive layer, characterized in that the above-mentioned adhesive layer is formed of an electron beam curing adhesive comprising a polyurethane resin reactive to radiations and a monofunctional (meth)acrylate monomer.

According to the second aspect of the invention wherein the radiation reactive polyurethane resin is used as the abovementioned polyurethane resin, there is provided a thermal mimeograph paper which has no adverse influence on the thermoplastic film and excels in adhesion, image quality and resolving power—because the adhesive containing this resin cures instantaneously at low temperatures, and has excellent wear resistance—because the above-mentioned polyurethane resin is partially crosslinked.

The third aspect of this invention is directed to a thermal mimeograph paper used with a thermal mimeograph process wherein a heat emitter element of a thin type of partically glazed thermal head is allowed to generate heat in response to digital signals for images and characters, thereby perforating the film of said mimeograph paper in tune with said digital signals to make a stencil, characterized in that said mimeograph paper comprises a porous backing material and a thermoplastic resin film laminated thereon through an adhesive layer, said thermoplastic resin film having a thickness lying in the range of 2.0 to 6.0 μm and said adhesive layer being applied at a coverage lying in the range of 0.1 to 0.5 g/m$^2$ on solid basis as well as a printing process.

As a result of intensive studies, it has been found that the above-mentioned problems of the prior art can be solved by using such a thin type of partially glazed thermal head as shown in FIG. 2 as a thermal head of a digital type of thermal mimeograph machine and employing stencil paper in which the thermoplastic resin film has a thickness of 2.0 to 6.0 μm and the adhesive layer is applied at a coverage of 0.1 to 0.5 g/m$^2$ on solid basis. Thus, the present invention has a number of advantages that (i) the production cost of stencil paper can be greatly reduced, (ii) the processability and handleability of stencil paper can be improved by increasing the rigidity of stencil paper, (iii) the storage stability of stencil paper can be improved and (iv) the solvent resistance (wear resistance) of stencil paper can be improved.

The fourth aspect of this invention is directed to a thermal mimeograph paper in which a porous backing material is laminated on one side with an adhesive layer, a thermoplastic resin film layer and a thermal fusion preventing layer in that order, characterized in that said thermal fusion preventing layer comprises a polyester resin and an amino-modified silicone oil.

According to the fourth aspect of this invention wherein the thermal fusion preventing layer is formed of a polyester resin and an amino-modified silicone oil, there is provided a thermal mimeograph paper which includes a layer excelling in strength, adhesion and prevention of fusion, and which can be continuously used with no accumulation of oil or scum on the thermal head and excel in sensitivity, resolution, etc.

BEST MODE FOR CARRYING OUT THE INVENTION

Figure 1:
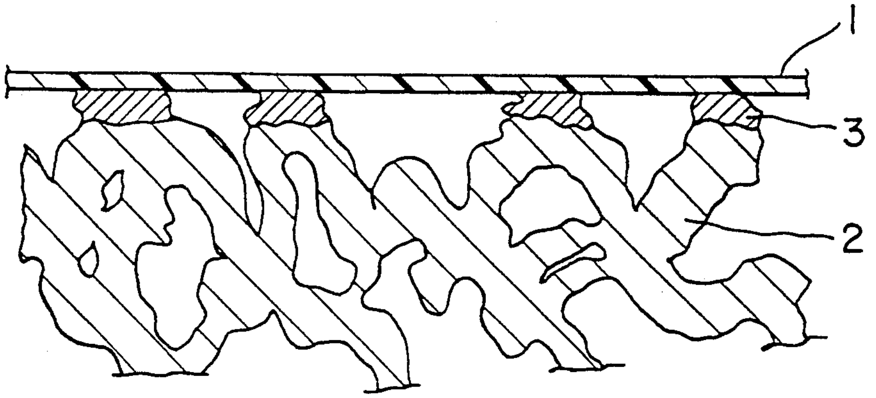
FIG. 1 is a sectional view showing the sectional structure (point-bonded structure) of the thermal mimeograph paper according to this invention.

For the thermoplastic resin film used in this invention, on which no critical limitation is imposed, suitable materials so far known in the art may be used. For instance, use may be made of films formed of polyvinyl chloride, vinyl chloride-vinylidene chloride copolymers, polyolefins such as polyester, polyethylene and polypropylene, and polystyrene. Of these films, particular preference is given to those formed of polyethylene terephthalate or its copolymers. In order to be easily perforated by heating means such as thermal heads, these thermoplastic resin film layers should have a thickness of at most 20 μm, preferably at most 10 μm and most preferably 1 to 4 μm.

A backing material, on which the above-mentioned film is to be laminated, is required to be such porous as to enable printing ink used for printing to pass through it. To this end, all materials used as the porous backing materials of conventional, thermal mimeograph paper products may be applied, including various forms of paper, esp., open-texture paper such as Japanese paper; synthetic paper or mesh sheets made up of such chemical fibers as rayon, vinylon, polyester, acrylonitrile and polyamide; and mixed paper obtained from chemical fibers and natural fibers such as Manila hemp, kozo (Broussonetia kajinoki) and mitsumata (Edgeworthia papyrifera).

In order to achieve the above-mentioned point-bonded structure in particular, various forms of tissue paper made up of a fibrous material having a maximum weight of 6.0 to 14.0 g/m$^2$ and a fiber diameter of 0.1 to 30 μm, for instance, natural fibers such as cotton, kozo, mitsumata, Manila hemp, flax, straw, baggasse and Ecquador hemp and/or synthetic fibers such as polyester, vinylon, acrylic, polyethylene, polypropylene, polyamide and rayon fibers; 50–400 mesh, preferably 150–400 mesh sheets; and porous synthetic resins may all be used if they allow the passage of ink, and may be suitably selected depending upon what purpose stencil paper is used for and what properties printing equipment has. It is noted that the use of hemp or mixed paper of hemp with synthetic fibers is more advantageous for improving image quality.

For bonding the porous backing material to the thermoplastic resin film, any suitable one of such bonding agents as solvent, aqueous dispersion, hot melt, reacting or heat curing, EB (electron beam) curing and UV (ultraviolet ray) curing types of adhesives may all be used. It is noted in this invention that no critical limitation is placed on the type of adhesive and how to cure it. However, preference is given to the EB (electron beam) curing type of adhesive which will be explained later in connection with the second aspect of this invention.

In order to achieve adhesion between the porous backing material and the thermoplastic resin film through a dot-bonded structure according to this invention, the total area of point junctions therebetween should account for 1 to 30%, preferably 1 to 20% of the area of any region of 180 μm×340 μm. When the bonded area is less than 1%, not only can any stable lamination be performed but also a problem arises in connection with wear resistance, although the resulting printed images are satisfactory.

A bonded area exceeding 30% is again unpreferred, since there is then a sharp drop of perforability, failing to give excellent printed images.

In order to obtain prints of high quality, the amount of the adhesive used for making adhesion between the porous backing material and the thermoplastic resin film should also lie in the range of 0.05 to 0.5 $g/m^2$, preferably 0.1 to 0.4 $g/m^2$. At less than 0.05 $g/m^2$ some adhesion failure is likely to occur, whereas at higher than 0.5 $g/m^2$ the perforability of stencil paper deteriorates, causing a serious drop of the quality of the printed image.

Referring here to the relationship between the maximum weight of the porous backing material and the amount of the adhesive fed, it is important that the amount of the adhesive fed onto the porous backing material for coating should be decreased with an increase in the maximum weight of the porous backing material.

The above-mentioned amount of the adhesive coated should desirously be regulated depending upon its type and how to coat it, but it is possible to control the bonded area by regulating the degree of impregnation of the adhesive. Usually, it is presumed that there is the following relation:

$$\text{Amount of the adhesive coated} = \text{Bonded area} \times \text{Degree of impregnation}$$

Thus, it is also desired to determine the amount of the adhesive coated in consideration of this point.

In the present disclosure, the wording "point-bonded structure" is understood to mean a structure wherein, as illustrated in the sectional view attached as FIG. 1, a porous backing material 2 and a thermoplastic resin film 1 are bonded together through a bonding agent 3 only at points through which the surface ends of fibers forming the former are in contact with the surface of the latter.

The term "bonded area" referred to in this disclosure is also understood to mean a two-dimensional area of the bonded junctions which are discernible, when the resulting thermal stencil paper is observed through the thermoplastic resin film under an optical microscope.

In what follows, the process for making stencil paper according to this invention will be explained.

(1) The adhesive may be coated by any suitable coating means inclusive of multi-roll coating, blade coating, gravure coating, knife coating, reverse-roll coating, spray coating, offset gravure coating and kissroll roll coating which are mentioned by way of example alone. In other words, any one of known coating techniques may be selected depending upon the type of adhesive and the purpose.

Preference is given to multi-roll coating, gravure coating or high-speed gravure coating. Also, the adhesive may be applied to either one of the film and backing material, but preference is given to applying the adhesive to the backing material.

(2) Rotogravure roll coating is effective for achieving a stable feed of the adhesive at small amounts. The gravure usable to this end should be preferably at least 100 1/inch, more preferably at least 150 1/inch but preferably at most 1000 1/inch, more preferably at most 600 1/inch in the number of lines, because too large a number of lines renders gravure-making difficult. The gravure is also desired to have a depth of 1 μm to 50 μm, preferably 3 μm to 20 μm.

The gravure may have any desired one of grate, inverted grate, pyramid, inverted pyramid, hatched, rotoflow and engraved patterns.

(3) In order to increase productivity, preference is given to using a non-solvent EB curing type of adhesive as the bonding agent. Such a type of adhesive having a viscosity of 500 to 500,000 cps inclusive at 60° C. or 20 to less than 300 cps at 90° C. provides products of improved quality, because it can be quickly and thinly processed if heated to higher than 90° C. during coating and, after coating, cooled into a highly viscous state in which its impregnation is limited.

The stencil paper according to this invention can be obtained by applying a thermal fusion preventing agent composed mainly of silicone oil onto the surface of the thermoplastic film of the thus obtained product The amount of silicone oil coated may lie in the range of 0.01 to 0.2 $g/m^2$, preferably 0.05 to 0.15 $g/m^2$.

More advantageously, the above-mentioned silicone oil may contain a thermally meltable resin as a binder, a surface active agent to improve slip properties and, if required, some additives such as crosslinkers and antistatics.

In the description that follows, the second aspect of this invention will be explained in greater detail with reference to the preferred embodiments.

The porous backing material used in the second aspect of this invention is required to be such porous as to enable printing ink used for printing to pass through it. To this end, all materials used as the porous backing sheets of conventional, thermal mimeograph paper products may be applied, including various forms of paper, especially, open-texture paper such as Japanese paper; synthetic paper or mesh sheets made up of such chemical fibers as rayon, vinylon, polyester, acrylonitrile and polyamide; and mixed paper obtained from chemical fibers and natural fibers such as Manila hemp, kozo and mitsumata, which are mentioned by way of example alone. However, use may advantageously be made of, for instance, paper, synthetic paper or mixed paper having a maximum weight of about 8 to 12 $g/m^2$.

The thermoplastic resin film to be laminated on the surface of the above-mentioned porous backing material may also be those used with conventional, thermal stencil paper. For instance, polyvinyl chloride films, vinyl chloride-vinylidene chloride copolymer films, films formed of such polyolefins as polyester, polyethylene and polypropylene and polystyrene films may all be used. In order to be easily perforated by heating means such as thermal heads, these thermoplastic resin film layers should have a thickness of at most 20 μm, preferably at most 10 μm and most preferably 1–4 μm.

This aspect of the invention is mainly characterized by an adhesive used for making adhesion between the abovementioned porous backing material and thermoplastic resin film layer. According this aspect of the invention, use is made of an electron beam curing adhesive comprising a polyurethane resin reactive to radiations and a monofunctional (meth)acrylate monomer.

The radiation-reactive polyurethane resin used for the above-mentioned adhesive is obtained by the reaction of a polyisocyanate, a polyol and a hydroxyl group-containing, monofunctional (meth)acrylate monomer, and is of high cohesion due to the presence of the urethane bond. Upon mixed with a (meth)acrylate monomer, this resin provides a composition, the viscosity of which is primarily depending upon temperature. The polyurethane resin, which has contained at least partly a (meth)acryloyl group reactive to radiations, is partly crosslinked during the curing of the adhesive to have a molecular weight so high that stencil paper is greatly improved in wear resistance.

Such polyurethane resins include commercially available, various grades of resins which may all be used in this invention. The polyurethane resins best-suited for this invention are obtained by the reaction of polyisocyanates, polyols, monofunctional alcohols and hydroxyl group-containing, monofunctional (meth)acrylate monomers.

The polyisocyanates used, for instance, include toluidine diisocyanate, 4,4'-diphenylmethane diisocyanate, isophorone diisocyanate, hexamethylene diisocyanate and xylylene diisocyanate. The polyols used, for instance, include 1,4-buthanediol, 1,3-butanediol, mono-(or di-, tri- or tetra-) ethylene glycol and 1,6-hexamethylenediol. The alcohols used, for instance, include methyl alcohol, ethyl alcohol, n-propyl alcohol, i-propyl alcohol, n-butyl alcohol, t-butyl alcohol, methyl cellosolve and ethyl cellosolve. For the hydroxyl group-containing, monofunctional (meth)acrylate monomers, all those so far known in the art may be used. Particularly preferable in this invention are, for instance, 2-hydroxyethyl (meth)acrylate, 2-hydroxypropyl (meth)acrylate and 2-hydroxy-3-phenoxy (meth)acrylate.

The polyurethane resins comprising the abovementioned components are obtained by the reaction of isocyanates with polyols+alcohols+hydroxyl groupcontaining monofunctional (meth)acrylate monomers at equivalent ratios of about 1.0 to 1.1, with the equivalent ratios of polyols to alcohols+hydroxyl group-containing, monofunctional (meth)acrylate monomers lying suitably in the range of about 1.0 to 0.5–2.5. The equivalent ratios of alcohols to hydroxyl groupcontaining, monofunctional (meth)acrylate monomers are suitably in the range of 2.5 to 0.01–0.5. It is unpreferred to use the alcohol in too small an amount, since the molecular weight of the resulting polyurethane resin then becomes too high, giving rise to a decrease in the dependence of its viscosity on temperature. It is again unpreferred to use the alcohol in too large an amount, since the molecular weight of the polyurethane resin then becomes too low, giving rise to a decrease in its adhesion. Referring to the amount of the hydroxyl group-containing, (meth-)acrylate monomer used, it is difficult to impart the desired wear resistance to stencil paper when it is too small, or the perforability of stencil paper decreases at the time of stencil making when it is in excess. Thus, the polyurethane resin used in this invention should preferably have a molecular weight lying in the range of about 500 to 1,500.

In this invention, it is understood that the abovementioned specific polyurethane resin may have a (meth)acrylate group in its molecule in its entirety, or may be a mixture of (meth)acrylate group-free and -containing polyurethane resins.

As the monofunctional (meth)acrylate monomers employed in this invention, use may be made of commercially available monomers, for instance, 2-hydroxyethyl (meth)acrylate, 2-hydroxypropyl (meth)acrylate, 2-hydroxy-3-phenoxypropyl (meth)acrylate, N-methylol (meth)acrylate, N,N'-diethylaminoethyl (meth)acrylate, (meth)acryloyloxyethyl monosuccinate and (meth)acryloyloxyethyl monophthalate For the purpose of improving the adhesion of the adhesive layer and within such a range as having no adverse influence on the thermal fusibility of the adhesive layer, minor amounts of polyfunctional (meth)acrylate monomers, etc. may be used in combination.

The above-mentioned polyfunctional (meth)acrylate monomers may be those known in the art and, preferably but not exclusively, include neopentyl glycol di(-meth)acrylate, ethylene glycol di(meth)acrylate, pentaerythritol tri(meth)acrylate and trimetylolpropane (meth)acrylate.

In view of the coating properties of the adhesive with respect to the porous backing material and preventing the porous backing material from being impregnated with the adhesive, the polyurethane resin should preferably be mixed with the mono- and polyfunctional (meth)acrylate monomers such that the resulting mixture has viscosities of at most 700 cps at 85° C. and at least 1,500 cps at 70° C. More illustratively, the weight ratios of the radiation reactive polyurethane resin, the monofunctional (meth)acrylate monomer and the polyfunctional (meth)acrylate monomer are in the range of 60–90:30–10:10–0, although this varies with the molecular weight of said polyurethane resin, the type of said (meth)acrylate monomers, etc.

The thermal mimeograph paper according to this aspect of the invention is obtained by bonding the thermoplastic resin film layer to the porous backing material by the abovementioned electron beam curing adhesive.

Not until now has any product of good quality been obtained by applying onto a porous backing material an electron beam curing adhesive to which a suitable fluidity has been imparted by heating. This is because the electron beam curing adhesive penetrates into the porous backing material. However, the adhesive used in this invention, because of its viscosity being greatly depending upon temperature as already explained, can be applied onto the porous backing material at a certain higher temperature to form an excellent coat.

When this adhesive is thinly applied onto the porous backing material, on the other hand, there is a drop of its temperature, which in turn causes a sharp rise in its viscosity, greatly limiting the amount of it penetrating into the porous backing material.

The adhesive should preferably be applied onto the porous backing material by multi-roll coating, but other coating techniques may be used as well, including blade coating, gravure coating, knife coating, reverse-roll coating, spray coating, offset gravure coating and kiss-roll coating, all mentioned for the purpose of illustration alone.

The adhesive coverage, for instance, is suitably in the range of about 0.5 to 5 μm in terms of thickness, because too much a coverage incurs a drop of the thermal perforability of stencil paper at the time of stencil making, or too small a coverage offers an adhesion problem.

The above-mentioned coating should preferably be carried out at a temperature enabling the adhesive to show sufficient coating properties, say about 80° to 90° C. However, the adhesive, if containing a minor amount of a solvent, may be coated even at normal temperature.

After the application of the above-mentioned electron beam curing adhesive, the adhesive layer loses fluidity by cooling. However, this layer is allowed to retain some adhesion and tackiness due to the presence of the monomer, thus enabling the backing material and film to be laminated together.

In the course of or after lamination, the adhesive layer is irradiated with electron beams through either the thermoplastic resin film layer or the porous backing material for curing, whereby both are firmly bonded together to provide the thermal mimeograph paper according to this invention.

As mentioned above, the adhesive layer may be irradiated with electron beams through either side of the laminate, using conventional irradiator equipment as such. For electron beam curing, use may be made of electron beams having an energy of 50 to 1,000 KeV, preferably 100 to 300 KeV, emitted from various electron beam accelerators, for instance, Cockroft-Walton, Van de Graaf, resonance transformer, insulating core transformer, linear, electrocurtain, dynatron and high frequency types of accelerators which operate preferably at an irradiation dose of about 1 to 5 Mrad.

The thus obtained thermal mimeograph paper according to this invention may provide an improved stencil. When the thermoplastic resin film is heated with a thermal head to perforate the mimeograph paper, however, there is a fear that depending upon the conditions applied, the thermoplastic resin film may be broken by the fusion of the thermal head thereto.

In order to eliminate such a problem, it is preferable to form on the thermoplastic resin film a thermal fusion preventing layer comprising silicone oil, silicone resin and a surface active agent, optionally with a binder resin.

The above-mentioned thermal fusion preventing layer may be formed by dissolving or dispersing the required components in an organic solvent or water to prepare a coating solution and applying it on the surface of the thermoplastic resin film in any suitable manner. This layer should preferably be as thin as about 0.1 to 10 μm, because too large a thickness gives rise to a drop of the heat sensitivity and hence perforability of stencil paper. This layer may also be formed at any desired time, e.g. in the course of or after forming the thermal mimeograph paper according to this invention, or alternatively on the raw material for the thermoplastic resin film.

According to this aspect of the invention wherein the radiation reactive polyurethane resin, which can provide an instantaneously curing adhesive at low temperatures, is employed as the polyurethane resin used for the adhesive, as mentioned above, there is provided a thermal mimeograph paper which is not only excellent in adhesion, image quality and resolution without having an adverse influence on the thermoplastic film but also show superior wear resistance, because the polyurethane resin is partially crosslinked.

The third aspect of this invention will now be explained in greater detail with reference to the preferred embodiments.

The thermal mimeograph equipment used in the third aspect of this invention is similar to a conventional printing machine except the structure of its thermal head.

Figure 2:
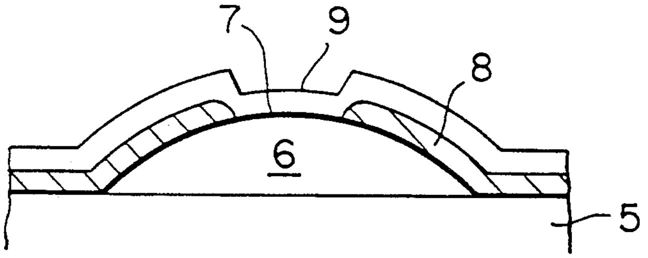
FIG. 2 is a sectional view illustrating the construction of a partially glazed type of thermal head used with the mimeograph paper according to this invention.
Figure 3:
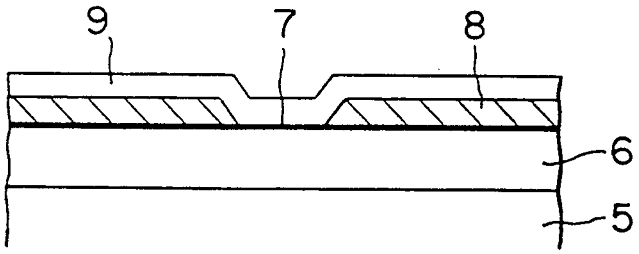
FIG. 3 is a sectional view illustrating the construction of a full-glazed type of thermal head used with conventional stencil paper.

As illustrated in FIG. 2, this thermal head includes a ceramic substrate 5 on which a convex, glazed layer 6 is provided. The layer 6 is then covered thereon with a heat emitter 7, on both sides of which electrodes 8 are in turn located. Over the resulting assembly there is provided a protective layer 9. By contrast, the conventional, full-glazed thermal head includes a ceramic substrate 5, on which a flat, glazed layer is formed, as illustrated in FIG. 3. The glazed layer is then covered thereon with a heat emitter 7, on both sides of which electrodes 8 are located. Over the resulting assembly there is provided a protective layer 9.

Such a thin type of partially glazed thermal head as shown in FIG. 2 is so less variable in terms of resistance value that it can give perforations corresponding to the heat emitter element, and is so convex in geometry that its contact with the film of stencil paper can be improved. With this thermal head, thus, even stencil paper having a relatively thick film can be well cut.

A porous backing material, on which the abovementioned film is to be laminated, is required to be such porous as to enable printing ink used for printing to pass through it. To this end, all materials used as the porous backing sheets of conventional, thermal mimeograph paper products may be applied, including various forms of paper, esp., open-texture paper such as Japanese paper; synthetic paper or mesh sheets made up of such chemical fibers as rayon, vinylon, polyester, acrylonitrile and polyamide; and mixed paper obtained from chemical fibers and natural fibers such as Manila hemp, kozo and mitsumata.

For the thermoplastic resin film to be laminated on the surface of the above-mentioned porous backing material, all thermoplastic resin films so far known in the art may be used, if they have a thickness of 2.0 to 6.0 μm. Particular preference is given to a 3.0 to 5.0-μm thick film formed of a polyethylene terephthalate homopolymer. The polyethylene terephthalate homopolymer film, because of its melt viscosity being greatly depending upon temperature, can be easily perforated in only its portions heated, giving perforations corresponding to the heat emitter element of the thermal head. Thus, this film serves to improve image quality, and is inexpensive as well.

A thermoplastic resin film of 2 μm in thickness is more easily perforated. However, the thinner the film, the larger the diameters of perforations and so the more the amount of ink transferred, thus presenting an offset problem. Also, the thinner the film, the lower the rigidity of stencil paper, thus causing a feeding trouble to the printing machine. A further decrease in the thickness of the film gives rise to a sharp rise in the cost. A thermoplastic resin film as thick as 6 μm or more in thickness, on the other hand, cannot be perforated even with the thin type of partially glazed thermal head. The thermoplastic resin film having a thickness lying in the range of 2 to 6 μm is thus preferable, since it can be well perforated, while imparting high rigidity to stencil paper and reducing the cost of stencil paper considerably.

The adhesive used for bonding the porous backing material to the thermoplastic resin film layer may be any desired one of those so far known in the art. In the present invention, however, preference is given to a solventless type of electron beam curing adhesive, esp., a radiation curing adhesive comprising a polyurethane resin and a monofunctional and/or polyfunctional (meth)acrylate.

Preferably but not exclusively, the formation of an adhesive layer may be achieved by coating the above-mentioned adhesive, if required together with other additives and viscosity regulating solvents, onto either the porous backing material or the thermoplastic resin film by suitable coating techniques such as multi-roll coating, blade coating, gravure coating, knife coating, reverse-roll coating, spray coating, offset gravure coating and kiss-roll coating.

Too large a coverage results in a drop of perforability, while too small a coverage contributes to an increase in perforability but presents a problem in connection with the wear resistance of stencil paper. According to this aspect of the invention wherein the solventless type of electron beam curing adhesive is used, a stencil paper having improved wear resistance can be obtained at a low coverage, say 0.1 to 0.5 g/m$^2$. The adhesive, because of being solvent-free, is unlikely to penetrate into the porous backing material even when the film has a relatively large thickness, and provides a stencil paper greatly improved in terms of perforability due to its small coverage. Since the adhesive is of the electron beam curing type, on the other hand, so high crosslinking densities are obtained that it can improve wear resistance even at a low coverage.

After the application of the above-mentioned electron beam curing adhesive, the adhesive layer loses fluidity by cooling. However, this layer is allowed to retain some adhesion and tackiness due to the presence of the monomer, thus enabling the backing material and film to be laminated together.

In the course of or after lamination, the adhesive layer is irradiated with electron beams through either the thermoplastic resin film layer or the porous backing material for curing, whereby both are firmly bonded together to provide the thermal mimeograph paper according to this invention.

As mentioned above, the adhesive layer may be irradiated with electron beams through either side of the laminate, using conventional irradiator equipment as such. For electron beam curing, use may be made of electron beams having an energy of 50 to 1,000 KeV, preferably 100 to 300 KeV, emitted from various electron beam accelerators, for instance, Cockroft-Walton, Van de Graaf, resonance transformer, insulating core transformer, linear, electrocurtain, dynatron and high frequency types of accelerators which operate preferably at an irradiation dose of about 1 to 5 Mrad.

The thus obtained thermal mimeograph paper according to this invention may provide an improved stencil. When the thermoplastic resin film is heated with a thermal head to perforate the mimeograph paper, however, there is a fear that depending upon the conditions applied, the thermoplastic resin film may be broken by the fusion of the thermal head thereto.

In order to eliminate such a problem, it is preferable to form on the thermoplastic resin film a thermal fusion preventing layer comprising a silicone oil, a silicone resin and a surface active agent, optionally with a binder resin.

The above-mentioned thermal fusion preventing layer may be formed by dissolving or dispersing the required components in an organic solvent or water to prepare a coating solution and applying it on the surface of the thermoplastic resin film in any suitable manner. This layer should preferably be as thin as about 0.1 to 10 μm, because too large a thickness gives rise to a drop of the heat sensitivity and hence perforability of stencil paper. This layer may also be formed at any desired time, e.g. in the course of or after forming the thermal mimeograph paper according to this invention, or alternatively on the raw material for the thermoplastic resin film.

The fourth aspect of the invention will now be explained in greater detail with reference to the preferred embodiments.

A backing material used in this aspect is required to be such porous as to enable printing ink used for printing to pass through it. To this end, all materials used as the porous backing sheets of conventional, thermal mimeograph paper products may be applied, including various forms of paper, esp., open-texture paper such as Japanese paper; synthetic paper made up of such chemical fibers as rayon, vinylon, polyester and acrylonitrile; and mixed paper obtained from chemical fibers and natural fibers. By way of example alone, paper, synthetic paper or mixed paper having a maximum weight of about 8 to 12 g/m$^2$.

The adhesive layer formed on the surface of the abovementioned porous backing material may be similar to those used for mimeograph paper products so far known in the art. For instance, the adhesive layer may be mainly composed of thermoplastic resins having a molecular weight of about 1,000 to a few tens of thousands, such as polyester resin, polyvinyl chloride resin, ethylene-vinyl acetate copolymer resin, chlorinated polypropylene, polyacrylic ester, terpene resin, coumarone resin, indene resin, SBR, ABS, polyvinyl ether and polyurethane resin.

In addition to the above-mentioned component, the adhesive layer may preferably contain a wax type of polymer or oligomer having a relatively low melting point, such as polyethylene glycol, polypropylene glycol, paraffin, aliphatic polyester, parablex, polyethylene sebacate and polyethylene adipate, in order to improve its thermal fusibility. These waxes may be used in place of the abovementioned thermoplastic resin. When the adhesive layer is to be cured by electron beams or chemical beams like ultraviolet rays, acrylic monomers or oligomers or the like are added to the above-mentioned resin.

In order to be easily perforated by heating means such as a thermal head, these adhesive layers should have a thickness of at most 10 μm, preferably at most 5 μm, most preferably 0.5 to 5 μm.

For the thermoplastic resin film laminated on the surface of the above-mentioned adhesive layer, suitable materials so far used with conventional, thermal mimeograph paper products may be used. By way of example alone, use may be made of films formed of polyvinyl chloride, vinyl chloride-vinylidene chloride copolymers, polyolefins such as polyester, polyethylene and polypropylene, and polystyrene.

It is noted that these thermoplastic resin film layers are generally provided on the adhesive layer by lamination, but they may be laminated by co-extrusion coating of the above-mentioned resin; in this case, however, it is not necessary to form the above-mentioned adhesive layer.

In order to be easily perforated by heating means such as a thermal head, these thermoplastic resin film layers have a thickness of at most 20 μm, preferably at most 10 μm, most preferably 1 to 4 μm.

The thermal mimeograph paper obtained according to such a process as mentioned above may provide an improved stencil. When the thermoplastic resin film is heated with a thermal head to perforate the mimeograph paper, however, there is a fear that depending upon the conditions applied, the thermoplastic resin film may be broken by the fusion of the thermal head thereto. Alternatively, when the mimeograph paper is perforated by exposure through a positive original film, there is a possibility that the original film may be fused to the thermoplastic resin film.

In order to solve such problems, the present invention is characterized in that the thermoplastic resin film is provided thereon with a thermal fusion preventing layer comprising a polyester resin and an amino-modified silicone oil.

Since this thermal fusion preventing layer is meltable by heating and excels in prevention of fusion, strength and adhesion, there is no possibility that oil or scum may accumulate on the thermal head.

For the polyester resin used in this invention, all resins so far employed as the binders for coating materials such as paint and printing ink may be used. However, particular preference is given to an aromatic, non-crystalline polyester having a molecular weight of about 5,000 to 50,000, preferably about 5,000 to 30,000. A polyester with a molecular weight less than 5,000 is less capable of forming a film, while a polyester with a molecular weight higher than 50,000 is insufficient in terms of perforability. Preferably, the polyester has a Tg of 50° C. or higher.

A more preferable polyester resin contains a relatively larger amount of such acid groups as sulfonic and carboxylic groups. A polyester resin with too high an acid number is less capable of forming a film, while a polyester resin with too low an acid value is poor in the affinity for the aminosilicone to be defined later, presenting problems in connection with migration of the aminosilicone or accumulation of oil or scum on the thermal head.

The term "aminosilicone" used in the present disclosure refers to an amino-modified dimethylpolysiloxane, and various types of aminosilicones, now commercially available, may all be used in this invention. It is understood that these aminosilicones may be used alone or in admixture.

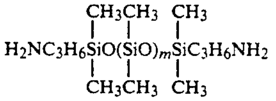
(I)

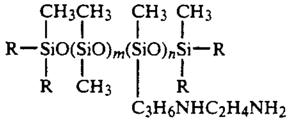
(II)

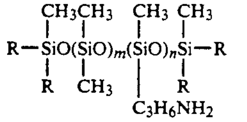
(III)

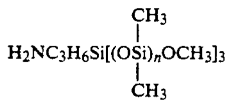
(IV)

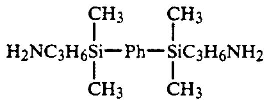
(V)

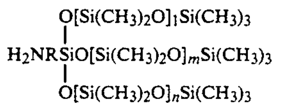
(VI)

-continued

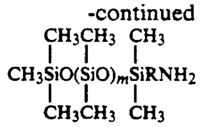
(VII)

wherein R is a lower alkyl, alkoxy or phenyl group.

Particular preference is given to the aminosilicones (I) to (III).

The above-mentioned aminosilicone should preferably be used in a proportion of 50 to 2 parts by weight per 50 to 98 parts by weight of the aforesaid polyester resin. Too small an amount of the aminosilicone makes releasability insufficient, whereas too large an amount of the aminosilicone renders the strength of the resulting film insufficient, making accumulation of oil or scum of the thermal head likely.

According to this invention, the above-mentioned thermal fusion preventing layer should preferably contain various antistatics. To this end, all antistatics so far known in the art may be used. However, particular preference is given to a quaternary ammonium salt type of antistatics. These antistatics should preferably be used in a proportion of 10 to 40 parts by weight per a total of 100 parts of the aforesaid polyester resin and aminosilicone.

According to this invention, the thermal fusion preventing layer may additionally contain various surfactants in order to achieve a further improvement in its releasability. To this end, all known surface active agents may be used. However, preference is given to a phosphate ester type of surfactants, among which the following ones are preferred.

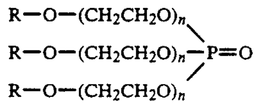

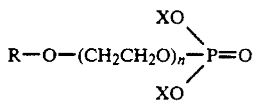

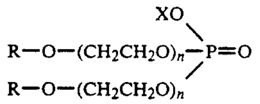

The above-mentioned surface active agent should preferably be used in a proportion of 5 to 20 parts by weight per a total of 100 parts by weight of the aforesaid polyester resin and aminosilicone.

The thermal fusion preventing layer comprising the abovementioned components may be provided by dissolving or dispersing the required components in a suitable organic solvent such as methyl ethyl ketone, toluene or cyclohexanone to prepare a coating solution and coating it onto the thermoplastic resin film layer in any desired manner.

The thermal fusion preventing layer should preferably have a thickness lying in the range of 0.01 to 5 μm. At less than 0.01 μm no sufficient prevention of fusion is achieved with sticking. At more than 5 μm, on the other hand, much energy is needed for thermal perforation and the resulting perforations decrease in diameter, thus causing a drop of the sensitivity to stencil-making. The thermal fusion preventing layer should most preferably have a thickness lying in the range of 0.05 to 1 μm.

According to the present invention wherein the thermal fusion preventing layer of thermal mimeograph paper is formed of a polyester resin and an amino-modified silicone oil, as mentioned above, thereby improving its strength, adhesion and prevention of fusion, there is provided a thermal mimeograph paper which can be continuously used with no accumulation of oil or scum on a thermal head, and excels in sensitivity and resolution.

These effects are presumed to be due to the facts that the polyester resin shows good adhesion to the thermoplastic resin film and that the amino group of the aminosilicone excelling in lubricating properties and releasability is bonded to the carbonyl, carboxylic, sulfonic or hydroxyl group of the polyester resin by way of hydrogen or acid base bonding, so that the aminosilicone and polyester resin can be well compatibilized with each other and so produce their own actions satisfactorily.

The present invention will now be explained in greater detail with reference to the following examples and comparative examples, wherein "parts" and "%" are given by weight, unless otherwise stated.

EXAMPLE A AND COMPARATIVE EXAMPLE A

With the thermoplastic resin films, porous backing sheets and adhesives shown in Tables A1 and A2 on the following pages, thermal mimeograph paper products were prepared under the conditions set out therein. It is noted that the film of each mimeograph paper was coated on the surface to be printed with a thermal fusion preventing layer composed mainly of silicone oil at a full 0.10 g/m² coverage.

The obtained stencil paper products were processed into stencils with thermal recording hardware (APX-8080 made by Gakken Co., Ltd.), with which prints were then obtained. The obtained results are reported in Tables A1 and A2.

TABLE A1

| Examples | Film | Backing sheet | Adhesives | Coating Means (Coating Temp.) | Coverage | Bonded Area | Image Quality of Prints | Bonded Structure |
|---|---|---|---|---|---|---|---|---|
| A1 | PET 1.8μ | Hemp 10.0 g/m² | EB1 (KT-1320) | Multi-roll coating (95) | 0.46 g/m² | 25.6% | ○ | Point-bonded structure |
| A2 | " | 7.0 g/m² | EB2 (KT-1322) | Gravure pyramid 500 l/8μ (90) | 0.30 | 4.0 | ◎ | |
| A3 | " | Polyester paper 8.0 g/m² | EB3 (KT-1323) | Gravure Inverted pyramid 180 l/8μ (85) | 0.20 | 1.8 | ◎ | |
| A4 | " | Mesh #150 | Emulsion 5% BPn3110H (Toyo Ink Co., Ltd.) | Impregnating lamination (20) | 0.45 | 15.3 | ○ | |
| A5 | " | #330 | Emulsion 3% BPn3110H (Toyo Ink Co., Ltd.) | Impregnating lamination (20) | 0.21 | 3.0 | ◎ | |
| A6 | " | Hemp 8.9 g/m² | EB4 | Gravure pyramid 200 l/10μ (93) | 0.37 | 7.2 | ◎ | |
| A7 | PET 1.8μ | Hemp 8.5 g/m² | EB4 | Gravure hatched 200 l/10μ (93) | 0.57 g/m² | 10.4% | ○ | |
| A8 | " | " | " | Gravure pyramid 550 l/8μ (93) | 0.18 | 5.6 | ◎ | |
| A9 | " | Mesh #250 | V-200 swtx (Toyo Ink Co., Ltd.) | Impregnating lamination (20) | 0.36 | 11.8 | ○ | |

*Viscosities of EB curing adhesives at varied temperatures

| | 90° C. | 60° C. |
|---|---|---|
| EB1 | 350 | 8000 |
| EB2 | 70 | 550 |
| EB3 | 18 | 77 |
| EB4 | 220 | 2700 |

*Viscosities were measured with VIBRO VISCOMETER CJV-2000 (made by Chichibu Cement Co., Ltd.)
*Bonded areas were determined by a weight method after photographing.
◎: Superior
○: Good
x: Inferior

TABLE A2

| Examples | Film | Backing sheet | Adhesives | Coating Means (Coating Temp.) | Coverage | Bonded Area | Image Quality of Prints | Defects | Bonded Structure |
|---|---|---|---|---|---|---|---|---|---|
| A1 | PET 1.8μ | Hemp 10.0 g/m² | EB4 | Multi-roll coating (93) | 0.04 g/m² | 1.3% | ◎ | Product was not good due to a number of unbonded regions. | Point-bonded structure |
| A2 | " | " | " | Multi-roll coating (93) | 1.6 g/m² | 31.4% | x | | Surface-bonded structure |
| A3 | " | " | EB3 | Multi-roll coating (90) | 0.08 g/m² | 1.5% | ◎ | Wrinkling was likely to take place during | Point-bonded |

TABLE A2-continued

| Examples | Film | Backing sheet | Adhesives | Coating Means (Coating Temp.) | Coverage | Bonded Area | Image Quality of Prints | Defects | Bonded Structure |
|---|---|---|---|---|---|---|---|---|---|
| | | | | | | | | lamination, with lack of stability. | structure |

EXAMPLE B1

Seventy six (76) parts of a radiation reactive polyurethane resin, 22 parts of an acrylic ester monomer (Alonix M5700 made by Toa Gosei K.K.) and 2 parts of trimethylolpropane triacrylate were mixed together into an electron beam curing adhesive.

Using di-n-butyltin dilaurate and m-benzoquinone as catalysts, the above-mentioned polyurethane mixture was synthesized from the following components:

| | |
|---|---|
| Tolylene diisocyanate | 2.00 mol |
| 1,3-butanediol | 0.80 |
| n-butanol | 1.16 |
| i-isopropyl alcohol | 1.26 |
| 2-hydroxyethyl acrylate | 0.10 |

The above-mentioned electron beam curing adhesive was applied at 80° C. on one side of Manila hemp-/polyester mixed paper at a coverage of 2 g/m$^2$, and a 2-$\mu$m thick polyethylene terephthalate film was then pressed thereon. After that, the adhesive was irradiated with electron beams at a dose of 3 Mrad for lamination. In addition, a thermal fusion preventing agent comprising a mixture of silicone oil with polyester resin was applied onto the surface of the polyester film at a dry coverage of 0.5 g/m$^2$ to obtain a thermal mimeograph paper according to this invention.

EXAMPLE B 2

The following electron beam curing adhesive was used in place of that referred to in Example B1 to obtain a thermal mimeograph paper according to this invention in similar manners as described in Example B1. The electron beam curing adhesive used was prepared by mixing 80 parts of a radiation reactive polyurethane resin with 20 parts of an acrylic ester monomer (Alonix M5700 made by Toa Gosei K.K.). Using di-n-butyltin dilaurate and mbenzoquinone as catalysts, the above-mentioned polyurethane mixture was synthesized from the following components:

| | |
|---|---|
| Tolylene diisocyanate | 3.00 mol |
| 1,3-butanediol | 0.30 |
| 1,4-butanediol | 0.20 |
| n-butanol | 1.50 |
| i-isopropyl alcohol | 1.60 |
| Methyl cellosolve | 0.50 |
| t-butanol | 0.20 |
| 2-hydroxyethyl acrylate | 0.20 |

EXAMPLE B3

The following electron beam curing adhesive was used in place of that referred to in Example B1 to obtain a thermal mimeograph paper according to this invention in similar manners as described in Example B1.

The electron beam curing adhesive used was prepared by mixing together 70 parts of a radiation reactive polyurethane resin, 25 parts of an acrylic ester monomer (Alonix M5700 made by Toa Gosei K.K.) and 5 parts of an acrylic ester monomer (Alonix M5600 made by Toa Gosei K.K.).

Using di-n-butyltin dilaurate and m-benzoquinone as catalysts, the above-mentioned polyurethane mixture was synthesized from the following components:

| | |
|---|---|
| Tolylene diisocyanate | 3.00 mol |
| 1,3-butanediol | 0.80 |
| n-butanol | 1.85 |
| i-isopropyl alcohol | 1.85 |
| 2-hydroxyethyl-3-phenoxy acrylate | 0.70 |

COMPARATIVE EXAMPLE B1

A comparative mimeograph paper was obtained by following the procedures of Ex. B1 with the exception that the adhesive coating material used was prepared by dissolving 10%—on solid basis—of a polyester resin (Vylon 200 made by Toyobo Co., Ltd.) in methyl ethyl ketone.

COMPARATIVE EXAMPLE B2

A comparative mimeograph paper was obtained by following the procedures of Ex. B1 with the exception that the amount of n-butanol was changed to 1.26 mol without using 2-hydroxyethyl acrylate.

EXAMPLE OF USE

With the present and comparative mimeograph paper products, stencil-making and printing were carried out with Richo Preport (?) SS 870. The results are reported in the Table B1.

TABLE B1

| | | Sensitivity | Density | Stencil Wear |
|---|---|---|---|---|
| Ex. | B1 | good | good | good |
| | B2 | good | good | good |
| | B3 | good | good | good |
| Comp. | B1 | bad | bad | good |
| | B2 | good | good | slightly bad |

EXAMPLE C1

While heated at 90° C., an electron beam curing adhesive comprising 76 parts of an electron beam curing polyurethane resin and 20 parts of an acrylic ester monomer (Alonix M5700 made by Toa Gosei K.K.) was coated at a dry coverage of 0.3 g/m$^2$ onto a Manila hemp/polyester fiber mixed paper having a maximum weight of about 10 g/m$^2$ by multi-roll coating, and was laminated thereon with a 3.0-$\mu$m thick polyethylene terephthalate homopolymer film. After that, the adhesive layer was cured by exposure to 3-Mrad electron beams. In addition, a thermal fusion preventing layer comprising a silicone oil/polyester resin mixture was applied onto the polyester film side at a dry coverage of 0.1 g/m$^2$ to obtain a thermal mimeograph paper according to this invention.

EXAMPLES C2-C5 & COMPARATIVE EXAMPLES C1-C3

Thermal mimeograph paper products according to this invention and for the purpose of comparison were obtained by following the procedures of Ex. C1 with the exception that the thermoplastic resin film and the coverage of adhesive were changed, as set out in the following Table C1.

TABLE C1

| | Films | Coverage of Adhesive |
|---|---|---|
| Examples | | |
| C2 | PET 3.5 μm | 0.1 g/m² |
| C3 | PET 4.0 μm | 0.3 |
| C4 | PET 4.5 μm | 0.4 |
| C5 | PET 5.0 μm | 0.5 |
| Comp. Ex. | | |
| C1 | PET 1.5 μm | 1.0 g/m² |
| C2 | PET 6.5 μm | 2.0 |
| C3 | PET 3.0 μm | 1.5 |

EXAMPLE OF USE

With the present and comparative thermal mimeograph paper products, stencil-making was performed on an experimental stencil-making machine including a thin type of partially glazed thermal head and a full-glazed thermal head. After that, printing was carried out with Richo Preport SS 950 to evaluate the density and resolution of the prints. The results are reported in the following Table C2.

TABLE C2

| | | Partially glazed TH | | Full-glazed TH | |
|---|---|---|---|---|---|
| | | density | resolution | density | resolution |
| Ex. | C1 | ◎ | ◎ | Δ | Δ |
| | C2 | ◎ | ◎ | Δ | Δ |
| | C3 | ◎ | ◎ | x | x |
| | C4 | ◎ | ◎ | x | x |
| | C5 | ◎~○ | ◎ | x | x |
| Comp. | C1 | ◎ | x | ○ | ○ |
| | C2 | x | ○ | x | x |
| | C3 | Δ | ○ | Δ | Δ |

◎: Superior
○: Good
Δ: Inferior
x: Practically useless

With the present invention as mentioned above, it is possible to achieve stencil paper which can be well fed through a printing machine and impart good quality to the resulting image and is very inexpensive as well; cut down the cost of prints. Why such effects are obtained in this invention is due to the fact that the thin type of partially glazed thermal head is in good contact with the film and the inexpensive stencil paper excelling in perforability and rigidity and including a thick film is used for stencil-making.

EXAMPLE D AND COMPARATIVE EXAMPLE D

A thermal mimeograph paper was make by laminating a thermoplastic resin film layer (having a thickness of 2 μm and formed of polyethylene terephthalate) onto a porous backing material (paper having a thickness of 40 μm and a maximum weight of 10.3 g/m²) through an adhesive layer (comprising a polyester resin and an acrylic ester at a weight ratio of 4:1). On the thermoplastic resin film layer there was coated each of the resinous compositions of Examples D1 and D2 and Comparative Examples D1 and D2 at a given thickness. Subsequent drying gave a thermal fusion preventing layer, thereby obtaining thermal mimeograph paper products according to this invention and for the purpose of comparison.

With a thermal head, each of these mimeograph paper products was used 50 times at a voltage of 0.10 mJ for continuous stencil-making. After that, the state of the thermal head was observed. The results are set out in Table D1 to be given later.

EXAMPLE D1

| | |
|---|---|
| Saturated polyester resin (Vylon 200 made by Toyobo Co., Ltd.) | 8 parts |
| Amino-terminated polysiloxane resin (X-22-161B made by The Shin-Etsu Chemical Co., Ltd.) | 2 |
| Antistatic (Anstex C-200X made by Toho Chemical Co., Ltd.) | 2 |
| Methyl ethyl ketone | 540 |
| Cyclohexanone | 60 |
| (Coating thickness of 0.1 μm on dry basis) | |

EXAMPLE D2

| | |
|---|---|
| Saturated polyester resin (Vylon 200 made by Toyobo Co., Ltd.) | 8 parts |
| Amino-terminated polysiloxane resin (X-22-161B made by The Shin-Etsu Chemical Co., Ltd.) | 3 |
| Antistatic (Anstex C-200X made by Toho Chemical Co., Ltd.) | 2 |
| Phosphate ester type of surfactant (Gafac RA-600 made by Toyo Chemical Co., Ltd.) | 1 |
| Methyl ethyl ketone | 540 |
| Cyclohexanone | 60 |
| (Coating thickness of 0.1 μm on dry basis) | |

COMPARATIVE EXAMPLE D1

| | |
|---|---|
| Silicone oil (KF096 made by The Shin-Etsu Chemical Co., Ltd.) | 1 part |
| Methyl ethyl ketone | 50 |
| (Coating thickness of 0.1 μm on dry basis) | |

COMPARATIVE EXAMPLE D2

| | |
|---|---|
| Cellulose ester (CPA-504-0.2 made by Kodak Co., Ltd.) | 3 parts |
| Amino-terminated polysiloxane resin (X-22-161AS made by The Shin-Etsu Chemical Co., Ltd.) | 1 |
| Antistatic (Anstex C-200X made by Toho Chemical Co., Ltd.) | 1 |
| Methyl ethyl ketone | 250 |
| (Coating thickness of 0.1 μm on dry basis) | |

TABLE D1

| | | Sticking Resistance | Head Condition | Charged Potential* (mV) |
|---|---|---|---|---|
| Ex. | D1 | good | good | −800 |
| | D2 | good | good | −800 |
| Comp. | D1 | good | oil deposite | −10000 |

TABLE D1-continued

| | Sticking Resistance | Head Condition | Charged Potential* (mV) |
|---|---|---|---|
| D2 | good | scum deposits | −800 |

*Forcedly charged potential at a voltage of −6 KV for 10 seconds.

What is claimed is:

1. A thermal mimeograph paper comprising:
a porous backing material;
an adhesive layer laminated on one surface of said porous backing material;
a thermoplastic resin film layer laminated on said adhesive layer; and
a thermal fusion preventing layer laminated on said thermoplastic resin film layer, said thermal fusion preventing layer comprising an aromatic noncrystalline polyester resin having a molecular weight of about 5,000 to 30,000 and an amino-modified silicone oil.

2. A thermal mimeograph paper as claimed in claim 1, wherein said thermal fusion preventing layer further comprises an antistatic.

3. A thermal mimeograph paper as claimed in claim 1, wherein said thermal fusion preventing layer further comprises surface active agent.

4. A thermal mimeograph paper as claimed in claim 1, wherein said thermal fusion preventing layer has a thickness of 0.01 to 5 $\mu$m.

5. A thermal mimeograph process wherein a heat emitter element of a thin type of partially glazed thermal head generates heat in response to digital signals for images and characters to perforate a film of mimeograph paper in tune with said digital signals for stencil-making, said mimeograph paper comprising a porous backing material and a thermoplastic resin film laminated thereon through an adhesive layer, said thermoplastic resin film being a film having a thickness of 2.0 to 6.0 $\mu$m and said adhesive being applied at a coverage of 0.1 to 0.5 g/m$^2$ on a solid basis thereof.

* * * * *